United States Patent [19]

Noe

[11] 4,270,655
[45] Jun. 2, 1981

[54] WALKING-BEAM CONVEYER

[75] Inventor: Oskar Noe, Mülheim, Fed. Rep. of Germany

[73] Assignee: BWG Bergwerk- und Walzwerk-Maschinenbau GmbH, Duisburg, Fed. Rep. of Germany

[21] Appl. No.: 102,277

[22] Filed: Dec. 10, 1979

Related U.S. Application Data

[63] Continuation of Ser. No. 868,339, Jan. 10, 1978, abandoned.

[30] Foreign Application Priority Data

May 19, 1977 [GB] United Kingdom ............... 21060/77

[51] Int. Cl.³ ............................................. B65G 25/00
[52] U.S. Cl. .................................... 198/774; 198/584
[58] Field of Search ............................... 198/774–776, 198/773, 777, 737, 740, 859, 614, 487, 584; 432/122, 239

[56] References Cited

U.S. PATENT DOCUMENTS

| 3,128,873 | 4/1964 | McCain et al. | 198/724 |
| 3,450,394 | 6/1969 | Wilde et al. | 432/122 X |
| 3,565,241 | 2/1971 | Race | 198/774 X |

Primary Examiner—Robert B. Reeves
Assistant Examiner—Douglas D. Watts
Attorney, Agent, or Firm—Karl F. Ross

[57] ABSTRACT

Disclosed is a walking-beam conveyer for transporting strip-metal coils or other heavy articles in a stepwise manner. The beam or sections of the beam are supported by rollers on respective support heads and are moved in the transport direction by rack and pinion drives. The beam is guided by rollers laterally as well as horizontally to prevent tilting or skewing. Lifting and lowering of the beam is effected by jacks bearing the support heads.

6 Claims, 3 Drawing Figures

WALKING-BEAM CONVEYER

This is a continuation of application Ser. No. 868,339, filed Jan. 10, 1978, now abandoned.

FIELD OF THE INVENTION

The present invention relates to conveyers and, more particularly, to walking-beam conveyers having one or more beam members guided laterally and supported by rollers and drive means for actuating the conveyers in transporting motion with respect to fixed lifting and lowering stations. The invention is especially directed to walking-beam conveyers for displacing strip coils and like heavy articles.

BACKGROUND OF THE INVENTION

Walking-beam conveyers serve to transport heavy articles by a composite motion comprising a lift-transport-lower-return sequence to advance the material or articles to be moved. Such articles may be coils of sheet material and the like of a weight of about 10–50 metric tons each. The articles rest on support rails or beams flanking the "walking" beams and are lifted therefrom, advanced and lowered thereon during each operating cycle.

A walking-beam system is known in which the beam-drive mechanism comprises a hydraulic cylinder. The cylinder is mounted substantially flush with the mill work floor and the effective stroke of the cylinder is greater than the overall length, with respect to the direction of travel, of the article to be moved. Such an arrangement takes up a large amount of space. Furthermore, because of the relatively large effective stroke of the cylinder, it is not possible to move the walking beam or its separately displaceable sections in a completely straight line. Thus, skewing of the assembly occurs because the walking beam is not closely guided laterally or from above but merely rests on the guide-roll heads.

In addition, the effective length of the conveyer is limited to the length of the effective stroke of the cylinder because the stroke has to take into account the loading of the walking beam by relatively heavy articles.

OBJECTS OF THE INVENTION

It is an object of the present invention to provide an improved and compact walking-beam conveyer.

Still another object of the present invention is to provide a walking-beam conveyer that can be designed with practically unlimited effective length.

SUMMARY OF THE INVENTION

These objects are attained in accordance with my invention by providing a main transporting beam, which can be made up of a succession of beam members, carried by a plurality of vertically reciprocable support heads located at fixed points along the path of the beam. The conveyer comprises drive units attached to the main beam or the individual sections thereof, each drive unit including a rack-and-pinion mechanism powered by a motor via a step-down transmission; the drive unit can be raised and lowered with the associated beam or beam section. Preferably the rack is provided on the beam while the pinion is connected to a respective support head which also carries the preferably hydraulic motor and transmission.

In contrast with prior-art systems where the drive cylinder is in line with the walking beam, which will lead to disruptions in the floor area, the drive mechanism according to the present invention can be mounted below the floor level. This expedient can be utilized in powering any desired number of sub-units of the beam and any desired length of conveyer can be achieved while each section of the beam, even at full loading by heavy articles, will be powered effectively.

The effective length of the transport stroke of the lift-transport-lower-return sequence can be selected approximately as long as the walking-beam section. Both acceleration and deceleration of the conveyer are infinitely variable.

In accordance with yet another feature of the invention, I provide lateral guide rollers and hold-down rollers on the vertically reciprocable support heads. For this purpose, the walking beam or the sections thereof are furnished with guide flanges which are engaged from the side and from above by horizontal and vertical rollers. Such hold-down rollers will be required when the load-bearing end of the beam extends well beyond its support point so that the beam will tend to tilt. I thereby realize a very accurate guidance with very little deviation from a straight line by the beam or sections thereof which normally will rest loosely on the support rolls of the carrying or support heads.

Thus, it will be possible to arrange two conveyers spaced apart from each other by a distance which corresponds approximately to the length of the transport stroke, whereby, alternatingly, the ends of the two neighboring conveyers reach into the neighboring area for the transfer of an article from one conveyer to the other.

BRIEF DESCRIPTION OF THE DRAWING

The above and other features of my invention will become apparent from the following description, reference being made to the accompanying drawing in which.

SPECIFIC DESCRIPTION

Figure 1:
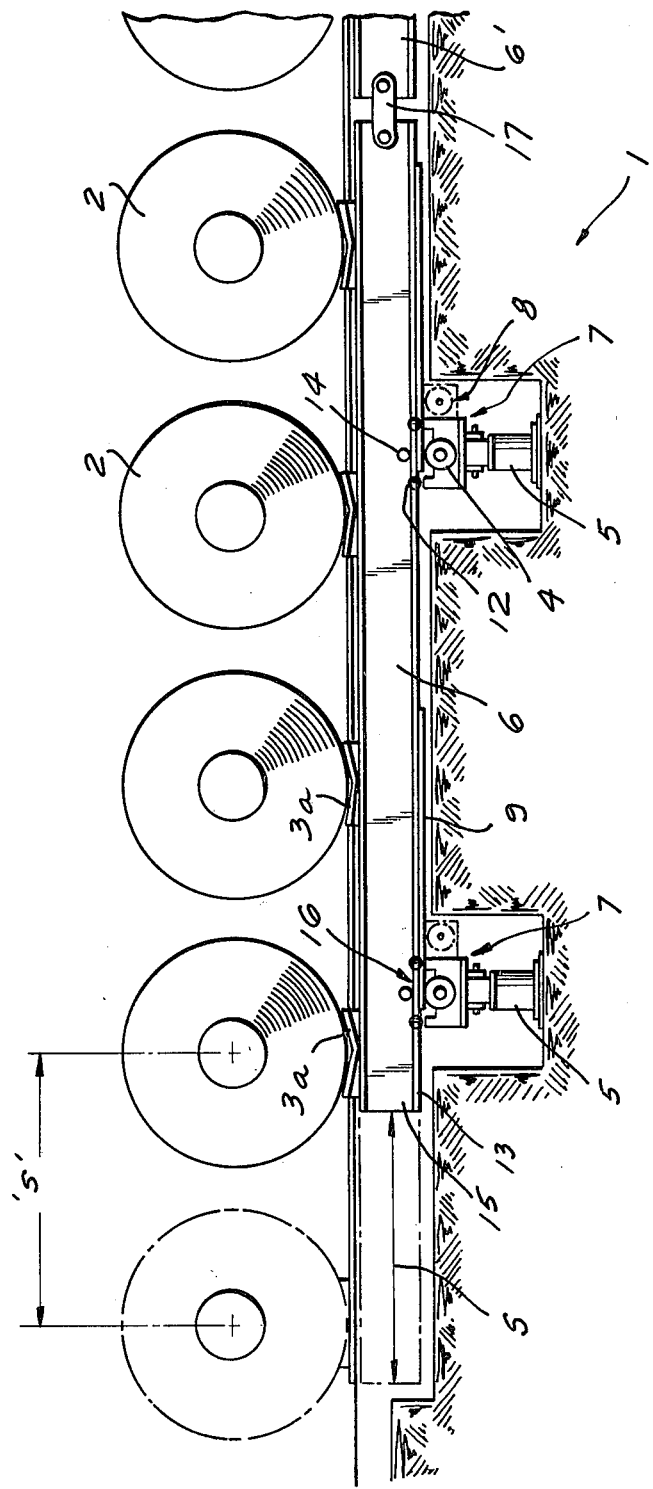
FIG. 1 shows in side elevation the walking-beam conveyer according to the present invention.

As can best be seen in FIG. 1, a walking-beam conveyer is generally designated by the numeral 1. The conveyer 1 can serve to transport coils 2 of strip material such as sheet metal. The walking-beam consists of sections 6 and 6', joined by a coupling 17 which will permit relative motion of the sections 6 and 6' in a vertical plane while transmitting horizontal motion therebetween.

Figure 3:
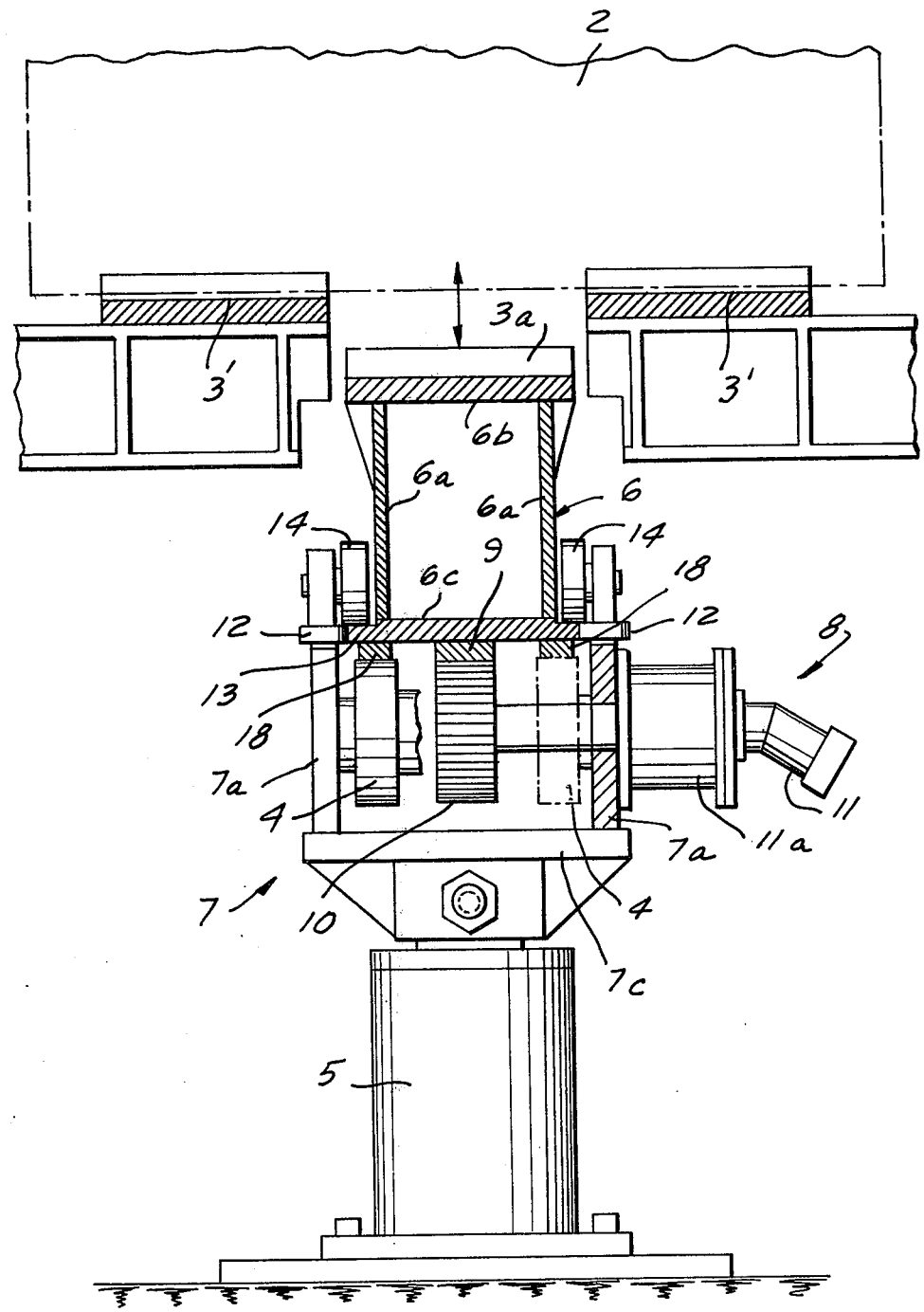
FIG. 3 is a section taken along line III—III of FIG. 2.

The beam sections are generally of rectangular cross-section as can best be seen in FIG. 3, comprising vertical sidewalls 6a, a load-carrying top plate 6b and a bottom plate 6c. As is indicated in FIG. 3, support bars 18 are provided at the sides of the bottom plate 6c which rest on carrying rollers 4.

FIG. 1 shows two actuating stations with lifting/lowering jacks 5 having carrying heads 7. The vertically reciprocable heads 7 are joined to the jacks 5 by standard clevis and brackets joints 5a as can best be seen in FIG. 2. The jacks have hydraulic cylinders with bases recessed in the floor of a service pit accommodating the conveyer.

Figure 2:
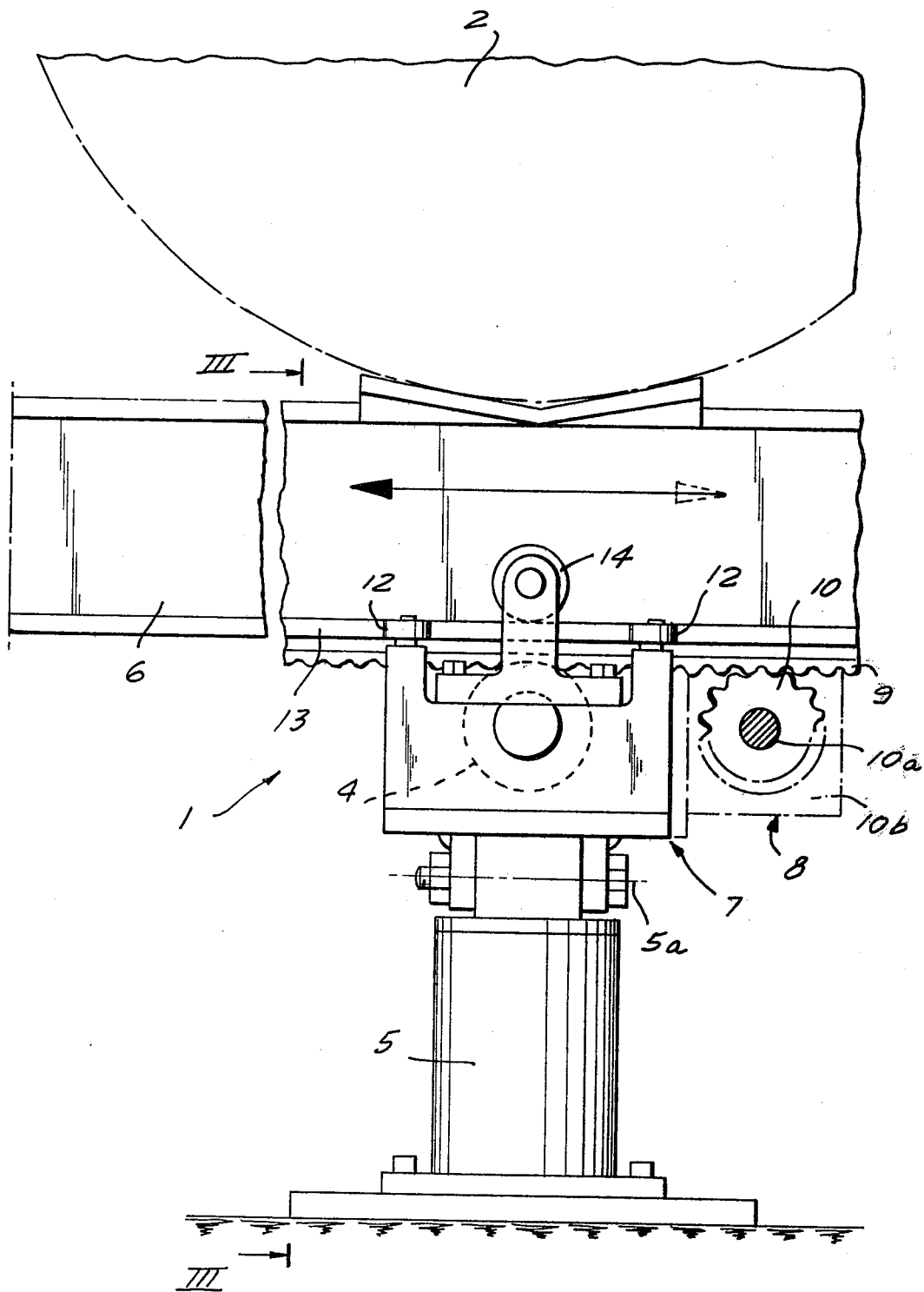
FIG. 2 shows in a view similar to FIG. 1, but on a larger scale, the support and actuating elements of the walking-beam conveyer.

The carrying heads 7 are each provided with a drive unit 8 as can best be seen in FIGS. 2 and 3. The drive unit 8 comprises a rack 9 which is centrally secured, e.g. by welding, to the bottom face of the walking-beam section 6, i.e. to the plate 6c. A pinion 10 is in mesh with the rack 9 and is held centrally on a pin or shaft 10a in a bracket 10b attached to the carrying head 7. Motive power is transmitted to the pinion by a motor 11, e.g. of the hydraulic type, via a speed-reducing transmission 11a secured to the pinion shaft 10a.

To ensure proper guidance of the walking beam, horizontal guide rollers 12 are mounted on side brackets 7a and engage with lateral edges of longitudinal flange portions 13 of bottom plate 6c of the beam as can best be seen in FIG. 3.

Furthermore, vertical guide rollers 14, also mounted on the side brackets 7a of the support head 7, bear down upon the top surfaces of the flange portions 13. These rollers 14 will be required when the conveyer comprises a section with a load-carrying end 15, as shown in FIG. 1, which projects cantilever fashion well beyond a support point 16 so that its load may tend to tilt it about point 16.

The operation of the walking-beam conveyer is known per se. During the rest or lowered position, as is indicated in FIG. 3, the articles or objects 2 to be transported are supported on rests or retainers 3' mounted on the banks of the service pit above the level of the retracted conveyer.

Actuation of the jacks 5 raises the beam sections 6, 6' and so forth whereby the loads 2 are lifted with the aid of retainers 3a. Then the motor 11 and transmission 11a will drive the pinion 10 and thus horizontally displace or transport the beam sections 6, 6' etc. via the corresponding racks 9 thereof.

Upon execution of the required forward stroke, designated by S in FIG. 1, the jacks 5 lower the beam and the articles 2 are deposited on corresponding retainers 3', one step advanced from their original position. This sequence is repeated as required to transport the objects for the desired distance. Once the beams have been lowered, they are returned in the opposite direction by reversing the motors.

During the lifting and lowering the articles are retained by corresponding retainers 3a on the beam or beam sections as can best be seen in FIG. 1.

The support or carrying head 7 is conveniently formed of structural bar material or the like and comprises side or face bracket portions 7a mounted in U-section fashion on base 7c of the carrying head as can best be seen in FIG. 3. The rolls 12 and rolls 14 are attained to the side brackets 7a in parallel by means of threaded fasteners or the like.

I claim:

1. A walking-beam conveyer for the intermittent advance of articles along a horizontal transport path, comprising:
    fixed rests alongside said transport path for temporarily receiving the articles to be advanced;
    at least two actuating stations at spaced-apart locations along said transport path;
    a horizontal beam member spanning said actuating stations;
    a vertically reciprocable supporting head at each of said actuating stations provided with roller means engaging said beam member for guiding same horizontally along said transport path;
    first drive means at each of said actuating stations engaging said supporting head for alternately raising and lowering same together with said beam member;
    a rack on said beam member overlying at least one of said actuating stations;
    a pinion on said supporting head of said one of said actuating stations in mesh with said rack; and
    second drive means on the last-mentioned supporting head coupled with said pinion and operable in timed relationship with said first drive means for linearly advancing said beam member, upon elevation thereof above the level of said rests, and retracting said beam member after a lowering thereof below said level whereby articles lifted off said rests by said beam member are redeposited thereon at a more forward location.

2. A walking-beam conveyor as defined in claim 1 wherein said first drive means comprises a hydraulic jack, said second drive means comprises a hydraulic motor provide with a step-down transmission.

3. A walking-beam conveyor as defined in claim 1 or 2 wherein said rack is mounted on the underside of said beam member, said roller means comprising a pair of carrying rollers flanking said rack and a pair of lateral guide rollers bearing upon opposite sides of said beam member.

4. A walking-beam conveyer as defined in claim 3 wherein said beam member is provided with a pair of longitudinal flanges engaged by said lateral guide rollers, said roller means further comprising a pair of hold-down rollers bearing from above upon said flanges.

5. A walking-beam conveyer as defined in claim 1 wherein said beam member is one of several longitudinally adjoining beam sections linked together by pivotal coupling means enabling limited relative motion of said beam sections in a vertical plane.

6. A walking-beam conveyer as defined in claim 1 wherein said transport path is defined by a pit accommodating said beam member, said rests being disposed on the banks of said pit, said first drive means being recessed below the bottom of said pit.

* * * * *